3,515,591
COLD WATER-DISPERSIBLE STARCH COMPOSITION AND METHOD FOR MAKING SAME
Jacob R. Feldman, New City, and Robert Edward Klose, Bronx, N.Y., and Robert V. MacAllister, Clinton, Iowa, assignors to General Foods Corporation, White Plains, N.Y., a corporation of Delaware
No Drawing. Filed Apr. 10, 1967, Ser. No. 629,384
Int. Cl. C08b 25/02; C13l 1/08
U.S. Cl. 127—32                                    9 Claims

ABSTRACT OF THE DISCLOSURE

A cold water-dispersible starch composition is prepared by mixing a solution of amylose or of a high amylose-containing starch and an aqueous suspension of a gelatinized starch, and drying the mixture to a powder.

BACKGROUND OF THE INVENTION

Starch is used as a base material in many convenience type foods on the market today such as powdered pudding and pie filling formations and dry gravy mixes. The reason for the popularity of starch in these food mixes is that it has good gel-forming characteristics, is easily digestible and is nutritious. Starch is made up essentially of two components, amylose and amylopectin. Amylose, in the soluble state, has excellent gel-forming properties, but unfortunately when it has been dried it becomes very insoluble at temperatures less than about 140° C. Amylopectin, on the other hand, is soluble at room temperature but has somewhat weaker gel-forming properties. When starch is gelatinized, as by heating it in water, the amylose present in the starch is solubilized, and consequently the starch is a good gel-former. Unfortunately, aqueous solutions of amylose are very unstable because the amylose has a tendency to precipitate out and form stable insoluble crystals. This phenomenon is known as retrogradation, and the retrograded amylose cannot be resolubilized in water unless autoclaving techniques are used. The retrograded amylose has no gelling capabilities.

Until recently, all of the powdered starch-containing formulations contained ungelatinized starch and, therefore, had to be cooked to effect gelatinization. These cooked-type puddings present an inconvenience to the housewife in that she must go through the time-consuming procedure of blending and cooking this mix with milk or water until the pudding thickens. Often the pudding burns during this process of cooking, causing the pudding to have an undesirable burnt taste. These cooked puddings present a further disadvantage in that they will undergo syneresis upon standing overnight. This is due to the retrogradation of the amylose present in the starch.

Recently, cold water-soluble starch products have been developed. The starch used in these products has been pregelatinized so that all that is necessary in preparing the product is that the dry mix be added to cold water or milk and blended until it thickens. Unfortunately, some of the amylose present in the pregelatinized starches retrogrades during drying and subsequent storage, with the result that a considerably greater amount of pregelatinized starch must be used in these cold water-soluble products than is required in ungelatinized starch-containing products which require cooking. At the high starch levels required products are obtained which are unpalatable because of their strong starchy taste and undesirable pasty texture.

The present commercial cold water-soluble starch products, such as instant puddings, contain phosphates. These phosphates form gels with the casein which is already present or added in the form of milk. Consequently, a lower amount of pregelatinized starch can be used in phosphate-containing instant starch products to produce a product having suitable gel strength than is possible when pregelatinized starch is the only gel-former present.

Instant starch puddings, whether made from pregelatinized starch and phosphates or from pregelatinized starch alone, generally have a coarser texture than freshly cooked starch puddings. The reason for the poor texture of instant puddings containing pregelatinized starch is that the amylose in the starch, which had been converted to a soluble form during gelatinization, retrogrades as the pregelatinized starch ages. As noted above, the amylose crystals caused by retrogradation impart a gritty texture to the prepared pudding.

Sarko et al. 3,086,890 invented a process of preparing cold water-soluble amylose which consists of the steps of heating the amylose sufficiently to solubilize it and then rapidly drying it, as on drying rolls. This product, however, slowly retrogrades upon standing and is unsuitable for use in packaged instant starch products which might remain on the shelf for a considerable period of time. The Germino patent, 3,128,209, likewise teaches a process for preparing a soluble amylose which consists of dissolving the amylose in an aqueous solution at a high temperature, adding to the solution and aqueous solution of a salt, and co-precipitating the amylose and salt from the solution. The product of this process is not suitable for many food uses however, since it introduces salt into the food product in an amount detectable by the consumer.

ADVANTAGES AND OBJECTS

A pregelatinized starch-based mixture, useful for making cold water-dispersible powdered products, has now been discovered which has none of the above-mentioned drawbacks. For example, cold water-soluble starch products having very good gel strength can be made from starch prepared according to this invention. Furthermore, these starch products have the smooth texture and very bland flavor normally associated with freshly cooked starch products because they can be made with much less starch than products made from the above-mentioned pregelatinized starch. Another advantage is that it is not necessary to supplement the starch in these products with phosphate-casein gel systems.

Accordingly, it is an object of this invention to provide an improved pregelatinized starch which can be used to prepare cold water-dispersible powdered foodstuffs. It is another object to provide a process for preparing a powdered, pregelatinized starch containing large amounts of cold water-soluble amylose. It is a further object of the invention to provide an improved instant starch pudding having a smooth texture and which will not undergo syneresis upon standing. These and other objects of the invention will become apparent from the following description and examples.

DESCRIPTION OF THE INVENTION

According to the invention, a cold water-dispersible, powdered material containing a high percentage of non-crystalline amylose is prepared by solubilizing the amylose and stabilizing it while it is in soluble form. This is accomplished by mixing the solubilized amylose with a sole pregelatinized starch. Since the amylose molecules are now substantially separated from each other, they cannot aggregate and hence are prevented from forming crystals.

Generally speaking, any starch can be used to disperse the amylose. Tuber starches, however, are preferred to cereal starches, especially when the final product is a foodstuff, because tuber starches have a better flavor and better keeping qualities than cereal starches. Typical tuber starches which can be used are potato and tapioca. Other materials which can be satisfactorily used in place of the starch components are high amylopectin-containing starch, such as waxy maize, and amylopectin obtained as a by-product in the manufacture of amylose.

The amylose used in preparing the product of the invention may be either a commercial amylose, such as those which have been extracted from cereal or tuber starches, or a starch bearing a high percentage of amylose. The amylose content of these starches should preferably be at least 65%, and they must not contain any components which will inhibit the solubilization of the amylose or adversely affect the resulting product. An example of a suitable high amylose containing starch is the high amylose hybrid corn, which contains 70% amylose and 30% amylopectin. The advantage of using a high amylose starch instead of commercial amylose is that it is cheaper and less likely to contain degraded amylose since it has never been subjected to chemical processing.

In the preferred embodiment, the amylose or high amylose-containing starch is dissolved in water by heating an aqueous suspension of amylose or high amylose-containing starch in an autoclave or continuous heat exchanger to a temperature of about 150° C. for about five minutes. The temperature of the solubilization step may vary from about 140–170° C. The amylose suspension is usually held at the elevated temperature for about one to five minutes, but the holding time can be longer, such as up to about thirty minutes. Care must be taken not to let the temperature go too high or else side reactions, such as hydrolysis or oxidation of the amylose may occur. These reactions are undesirable since they may adversely affect the gelling properties of the amylose. Other methods of solubilizing the amylose can also be used, such as jet cooking or extrusion.

Following the autoclaving step, the hot solution may be cooled to a suitably lower temperature, preferably below the atmospheric boiling point of water, to enable it to be handled more conveniently, although the temperature must be maintained above that at which the dissolved amylose would precipitate.

The cooled amylose solution is next mixed with an aqueous suspension of the second component of the invention, gelatinized starch. The starch can be gelatinized by any of the known methods, such as by heating a mixture of water and starch to about 60–100° C. and holding it at this temperature until substantially all of the starch granules are swollen and ruptured. Alternatively, the dispersion may be formed by adding dry pregelatinized starch to the amylose solution. After the amylose-gelatinized starch mixture has been thoroughly blended to insure uniform dispersion of the amylose molecules, it is dried.

The drying may be conducted by any known means, such as by spray drying, drum drying, or vacuum drying. The dried product is a fluffy white powder which dissolves easily in cold water or milk, to produce a firm gel having a smooth texture. The term cold water, as used in the present discussion, means water at a temperature ranging from about room temperature to the freezing point of water. The product is, of course, soluble in hot water also.

The ratio of solubilized amylose to gelatinized starch can be varied according to the properties desired in the final product. Typically, the amount of solubilized amylose added to the starch component will vary from about 20 to 65% of the combined weight of the solubilized amylose and pregelatinized starch, and the weight of gelatinized starch may vary from 35–80% by weight of the composition with the preferred range of solubilized amylose being about 25–35% for most applications.

Other methods of preparing the solubilized amylose-gelatinized starch product can be used. For example, a dough may be made by mixing the amylose and starch with a limited amount of water and extruding the dough at a temperature sufficiently high to solubilize the amylose and gelatinize the starch. The extrudate is then ground and screened, yielding a powdered product having good cold water solubility. Another procedure which may be used to prepare the amylose-starch mixture is to mix the amylose and starch in water and heat the mixture to a temperature sufficiently high to gelatinize the starch and solubilize the amylose. When using this procedure, care must be taken not to heat the starch to too high a temperature or else degradation will occur.

The product of this invention is useful in the preparation of instant foods, such as instant puddings, powdered gravy mixes and the like. The product is further useful in industrial application as a starting or intermediate material for the preparation of various compounds, particularly where a cold water-soluble starting material is desired. For best results, the starch-amylose product should preferably be ground sufficiently to pass through a 200 mesh screen (U.S. Standard).

In order that the invention may be better understood, the following examples will serve to illustrate specific applications of the invention.

Example I

An aqueous solution of amylose was prepared by heating a 5% suspension of amylose derived from potato starch in an autoclave to 145° C. and holding it at that temperature for five minutes. A 10% aqueous suspension of potato starch was gelatinized by heating the suspension to a temperature of 100° C. A sufficient quantity of the dissolved amylose was added to the potato starch suspension at 100° C. to constitute a 1:3 solubilized amylose-dispersed starch mixture. The mixture was blended thoroughly and dried on a double drum drier heated with 60 p.s.i.g. steam. The dried amylose-starch mixture was then ground in a Homoloid Mill until it passed through a 200 mesh screen (U.S. Standard).

A pudding was prepared by adding 17.5 gms. of the above prepared amylose-potato starch mixture and 40 gms. of milled sugar to 237 mls. of cold (8° C.) milk in the bowl of a Mixmaster and blending the resulting mixture for one minute. The pudding was then chilled for one-half hour in a refrigerator at 5–8° C. after which it was examined. It formed a firm gel having a good flavor and smooth texture. The pudding was examined after 24 hours and found to have undergone no syneresis.

Example II

The procedure of Example I was repeated except that tapioca starch was substituted for the potato starch. The resulting pudding was firm and had a smooth texture and bland taste. The pudding exhibited no syneresis after being stored for 24 hours.

Example III

The procedure of Example I was repeated, except that waxy maize starch was substituted for the potato starch, and sufficient amylose solution was added to the starch to constitute a 2:3 amylose-dispersed starch mixture. A pudding prepared from the product of this example was fast setting and formed a firm gel.

Example IV

The procedure of Example I was followed, except that amylose derived from corn starch was substituted for the potato starch derived amylose. A pudding made from the product of this example was quick-setting and formed a firm gel.

Although the examples are limited to the preparation of instant puddings, it is understood that the product may have other uses. Thus, gravies may be prepared by mixing an amylose-gelatinized starch product, such as that suggested in the examples, with a meat flavor, such as dry beef flavor, then adding the mixture to boiling water, stirring and cooling until a gel forms.

In view of the wide application of the invention, it is understood that the breadth of the invention is limited only by the scope of the appended claims.

What is claimed is:

1. A process for preparing cold water-dispersible starch mixtures comprising mixing an aqueous suspension containing gelatinized starch and a solution containing a component which has been solubilized at about 140–170° C., and is selected from the group consisting of amylose and a starch containing at least 65% amylose, and drying said mixture.

2. A process according to claim 1 wherein the gelatinized starch is a tuber starch and the solubilized component is amylose.

3. A process according to claim 1 wherein the gelatinized starch is selected from the group consisting of potato starch, tapioca starch and waxy maize starch, and the amylose is present in an amount of about 25–35% by weight of the mixture on a dry basis.

4. A process according to claim 1 wherein amylose is present in an amount of about 20–65% by weight of the mixture on a dry basis.

5. A process according to claim 4 wherein the starch containing at least 65% amylose is hybrid corn starch.

6. A process for preparing cold water-dispersible starch mixtures comprising, heating an aqueous mixture of amylose to a temperature sufficiently high to dissolve the amylose, cooling the amylose solution to a temperature below about 100° C., mixing said cooled solution with an aqueous suspension of gelatinized starch and drying the starch-soluble amylose mixture.

7. A process for preparing cold water-dispersible starch mixtures comprising moistening a mixture of a tuber starch and a member selected from the group consisting of amylose and a starch containing at least 65% amylose to form a dough, and extruding said dough at temperatures between 140° C.–170° C. to solubilize the amylose and gelatinize the starch.

8. A process for preparing cold water-dispersible starch mixtures comprising:
   (a) preparing an aqueous mixture of starch and a member selected from the group consisting of amylose and a starch containing at least 65% by weight of amylose,
   (b) heating said aqueous mixture at temperatures between 140° C.–170° C. to solubilize the amylose and gelatinize the starch, and
   (c) drying the aqueous mixture.

9. A cold water-dispersible starch composition comprised of a uniform dispersion of about 20–65% by weight soluble amylose and 35–80% by weight gelatinized starch.

References Cited

UNITED STATES PATENTS

| | | | |
|---|---|---|---|
| 3,086,890 | 4/1963 | Sarko | 127—71 X |
| 3,128,208 | 4/1964 | Zeitlin | 127—71 X |
| 3,222,220 | 12/1965 | Wurzburg | 127—71 X |
| 3,351,489 | 11/1967 | Battista | 127—71 X |

MORRIS O. WOLK, Primary Examiner

S. MARANTZ, Assistant Examiner

U.S. Cl. X.R.

99—139; 127—69